Aug. 8, 1967  E. KUGLER  3,334,552
FLEXIBLE BAG OF TUBULAR MATERIAL
Filed Nov. 22, 1963  2 Sheets-Sheet 2
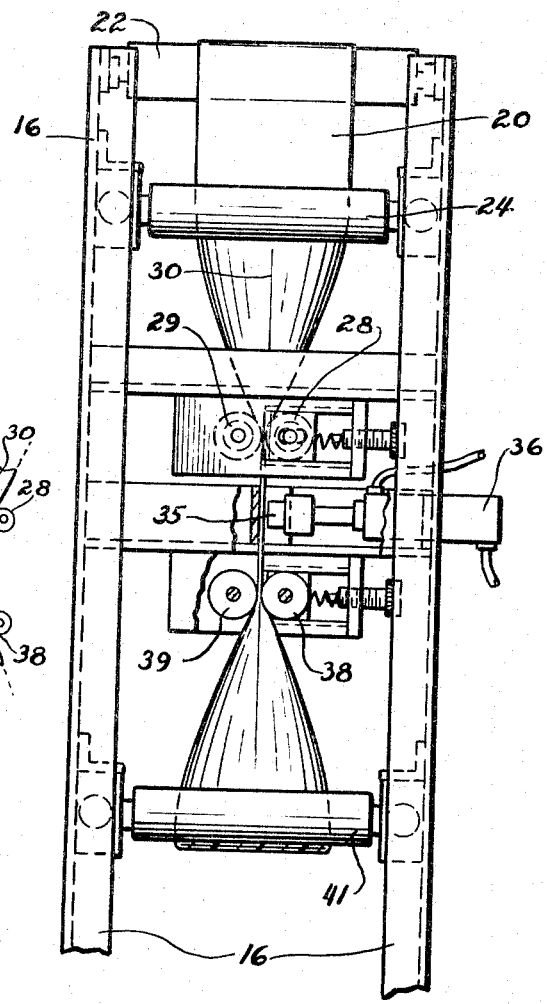
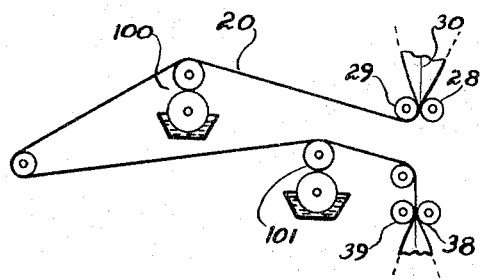
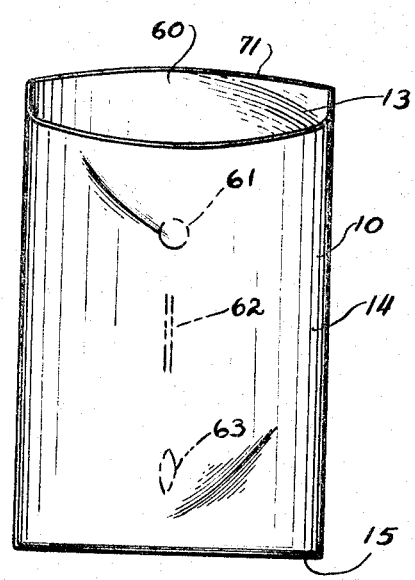
INVENTOR.
EMANUEL KUGLER
BY
Kleinberg & Lilling
ATTORNEYS

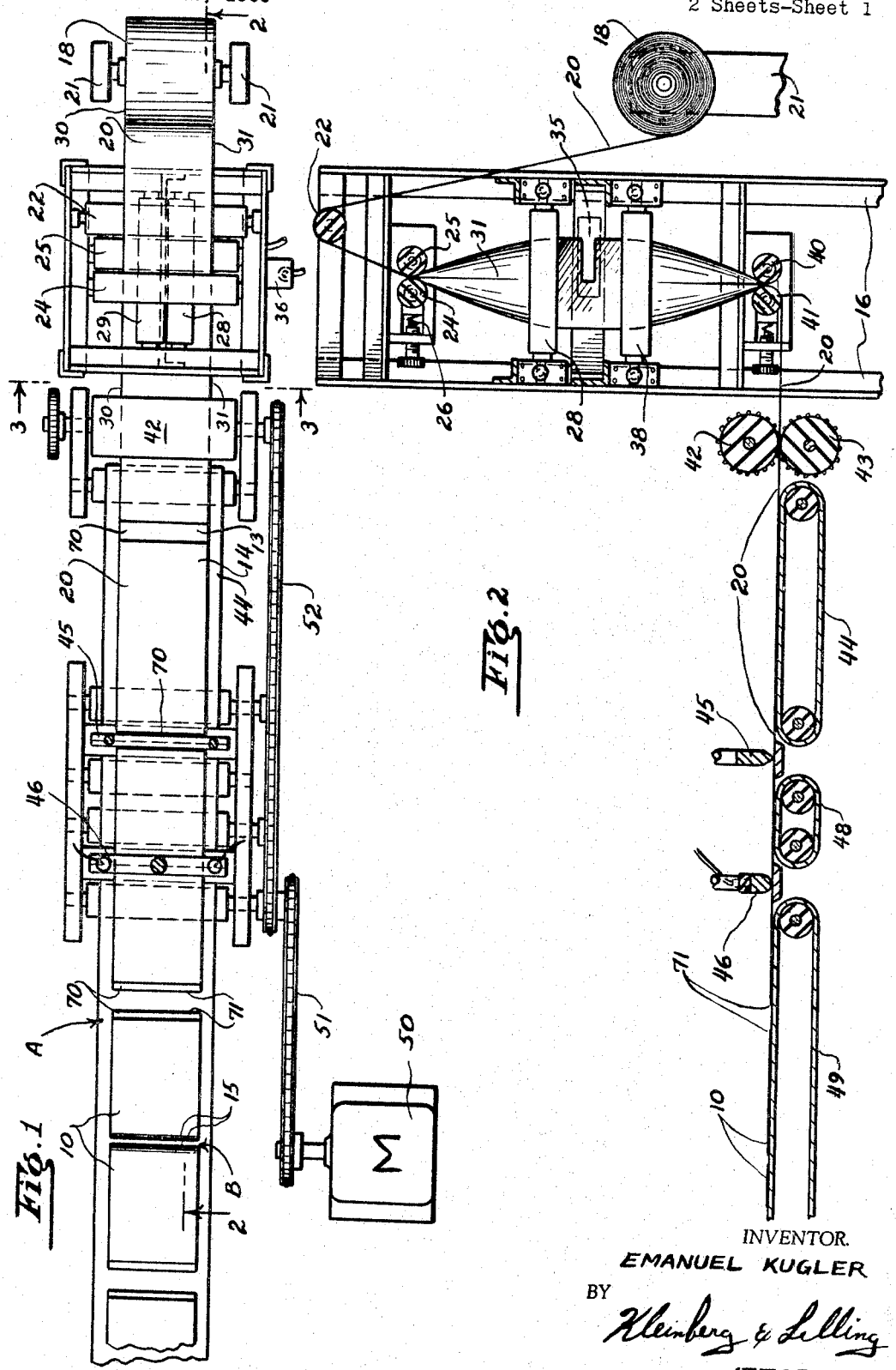

United States Patent Office 3,334,552
Patented Aug. 8, 1967

3,334,552
FLEXIBLE BAG OF TUBULAR MATERIAL
Emanuel Kugler, 124 Richmond Place, Lawrence,
Long Island, N.Y. 11559
Filed Nov. 22, 1963, Ser. No. 325,581
2 Claims. (Cl. 93—35)

This patent is concerned generally with the flexible packaging art; more particularly it describes a new and improved flexible bag, and a process and machine for the manufacture thereof.

Bags of plastic such as polyethylene or the like, are increasingly utilized today as inexpensive containers for the packaging of many items. Such present bags, however, suffer from several well known disadvantages. For example, during the fabrication of the conventional polyethylene bags, the sides of the same are usually heat sealed together simultaneously with, or prior to, the severing of the bag from the web of material. The thus formed side edges of the bag are necessarily rough and uneven. Any such irregularities may cause snags on items such as ladies hose, or the like, which may be packaged therewithin. This roughness and irregularity are in part due to uneven heat applied during the above-described welding and severing operations. Further, such heat sealed side edges are always of less strength than the plastic web itself. Therefore, the weakest part of the finished container is at the side edges, which additionally, is the portion of the container that must resist the most stress and should be strongest.

It would be better to fabricate bags from a continuous tube of plastic material so that it would only be necessary to heat seal one end, to wit, the bottom of the bag, during fabrication. There is, however, at present, no available machinery for accomplishing this on a mass-production basis.

Additionally, even if such machinery were available, it would not be capable of providing any of the multitude of required bag characteristics, such as an extending lip from one wall of the container in the area of the opening. Such extending lips are necessary and desirable for many purposes such as for filling the container, the stacking thereof, etc., or for adapting a bag closure.

It is a cardinal object of this invention, therefore, to provide an automatic machine and process to receive tubular polyethylene film in a continuous strip, and to produce therefrom flexible bags that have only one sealed marginal portion, and that have an extending lip, or thumb grip, or the like, in the area of the opening thereto.

Another primary object hereof is to provide equipment for the production of polyethylene bags from tubular film that will be versatile and that will be capable of producing a wide variety of improved containers on a mass-production basis.

Still further, the purpose of the invention set forth herein is the provision of inexpensive flexible containers of improved function, durability and appearance.

With these objects in view, the invention consists of the novel features of construction and arrangement of parts which will appear in the following specification and recited in the appended claims, reference being had to the accompanying drawings in which the same reference numerals indicate the same parts throughout the various figures, and in which:

FIG. 1 is a top plan view of a machine for producing the improved bags.

FIG. 2 is a sectional elevational view taken substantially along line 2—2 of FIG. 1.

FIG. 3 is a sectional elevational view taken substantially along line 3—3 of FIG. 1.

FIG. 4 is a front view of one typical flexible package produced according to this invention.

FIG. 5 is a fractional, reduced and primarily diagrammatic view of an additional or alternate device to be utilized in conjunction with the apparatus of this invention.

Referring now to FIGS. 1, 2 and 3 of the drawings, there is illustrated a machine having embodied therein the principal features of the invention and which is adapted to produce such bags as shown in FIG. 4. It will be noted that the finished bag 10 produced will have overlying walls 13 and 14 and may have cutouts, perforations or notches in at least one of the walls 14 as will be explained hereinafter. Additionally, the bag 10 will have only one sealed marginal edge 15 at the bottom thereof.

The machine is supported on a suitable frame 16. The material for forming the finished bag 10 is conducted to the machine from a supply roll 18 of a continuous web 20. The web 20 is of polyethylene or of a similar material and in the preferred embodiment of the invention, will be tubular (although flattened thereby forming overlying walls continuously and integrally joined at its edges). Of course, it will further be possible to provide a continuous web of two separate sheets sealed as by heat or the like at its edges or of one flat sheet with its edges longitudinally sealed to each other to form a continuous tube with a single weld line. The supply roll 18 will be supported on a suitable bracket 21. The tubular continuous web 20 will be conducted over a guide roller 22 at the top of the machine frame 16.

In the description following immediately hereinafter, the initial steps of processing are carried out as the web 20 descends vertically through the frame 16. This, of course, is not limiting and the machine could be constructed to accommodate a web passing in any direction.

From the guide roller 22, however, the web 20 passes between a first pair of pressure rollers 24 and 25. It will be desirable for the said rollers 24 and 25 to be tightly urged together with the web 20 therebetween. For this purpose, one of the rollers 24 may be urged as by an adjustable spring 26 toward the other roller 25. Thus, the force of contact between the first pair of rollers 24 and 25 may be adjusted merely by adjusting the first spring 26.

Spaced some distance below will be a second pair of pressure rollers 28 and 29 (see FIG. 3). This second pair of rollers 28 and 29 will be in a plane perpendicular to the direction of travel of the web 20 as will be the first pair of rollers 24 and 25. The second pair of rollers 28 and 29, however, will be perpendicular to the first pair of rollers 24 and 25.

Thus, the tubular web 20 between the first and second pair of rollers will assume the shape of a tetrahedran as will be evident from a comparison of FIGS. 2 and 3. Additionally, the portion of the web 20 that formerly formed the side edges 30 and 31 thereof will now form the center of the web 20. Below the second pair of rollers 28 and 29, there will still be a flat continuous web, but the walls of the web will be rotated substantially 90 degrees from the position of the web prior to passing through the first pair of rollers 24 and 25. Directly below the second pair of rollers 28 and 29, the web 20 will be partially severed, notched or grooved by any cutting tool 35. For ease of explanation and description, the cutting tool 35 herein illustrated is in the form of a piston 36 actuated die (see FIG. 3). By means of the cutting tool 35 any suitable aperture may be severed partially through the web 20 and through the now formed both walls thereof. It is contemplated that for optimum operation, the cutting tool 35 should be continuously operating to permit continuous and uninterrupted movement of the web 20 through the device. After passing the cutting tool 35 the web 20 will be urged between the third pair of pressure rollers 38 and 39 again journaled on shafts to be urged together and substantially parallel to but spaced from the second pair of rollers 28 and 29. This third pair of pressure rollers will serve to retain the material in a taut manner in the area of the cutting tool 35.

Spaced below there will be the fourth pair of pressure rollers 40 and 41 again journaled on suitable shafts in a plane substantially perpendicular to the direction of advance of the web 20 and substantially perpendicular to the third pair of pressure rollers 38 and 39. As will be seen especially by comparison of FIGS. 2 and 3, the tubular web 20 will again form a tetrahedran between the third and fourth pair of pressure rollers. The tubular material will again be rotated ninety degrees so that it is now substantially in the same radial position as it was when advanced from the supply roll 18. The edges of the material are again 30 and 31. However, one of the walls 14 of the tubular web will now have one or more apertures, notches or grooves therein as the result of cutting tool 35 as will be explained hereinafter in detail. The result of the above portion of the process and machinery is this provision of suitable openings in only one wall of a double or tubular web, a result which is otherwise only obtainable by relatively complicated, expensive and inefficient apparatus. The web 20 will now be conducted through a web severing apparatus (see FIG. 2).

In the illustrative embodiment of the invention, this next portion of the process will be accomplished while the web 20 is traveling in a substantial horizontal plane. This is not limiting, however, and it is in fact, contemplated that this next portion may be carried out as a continuation of the above-described while moving in a vertical plane.

The web 20 will first be conducted through a pair of draw rollers 42 and 43 to insure proper movement of the web 20 through the apparatus. The web 20 may then be conducted over a first conveyor belt 44 to a first knife 45. As illustrated, this knife 45 will be a cold knife and will act to shear through both walls 13 and 14 of the web 20. A second knife 46 will be spaced forward of the first knife 45 and will be what is referred to in the art as a "hot" knife or one which will simultaneously sever both walls of a web while heat sealing the edges of both walls of the web together. A middle conveyor belt 48 may be provided to conduct the web 20 between the first and second knives 45 and 46 and a final conveyor belt 49 may be provided to conduct the finished bags 10 to a packing, filling or stacking station or the like.

As disclosed in FIG. 1, a single motor 50 may be utilized to activate and rotate the draw rollers 42 and 43 and the first, middle and final conveyor belts 44, 48 and 49 by means of belt drives 51 and 52.

The operation of the device then is as follows:

The object of this invention is to produce a finished flexible bag 10 of the type disclosed in FIG. 4. The said bag 10 will consist of overlying walls 13 and 14 which are continuous and formed from tubular material and, therefore, do not require edge seams or welds. The only joined or welded seam on the bag 10 is the bottom seal 15. However, it is at times necessary to provide one or more cutouts in one of the walls 14 of the bag 10. For example, a cut-away portion of the wall 14 in the area of the opening to the bag 10 will provide an extending lip 60 on the other wall 13 of the bag. Such an extending lip 60 is commonly required in bags 10 to facilitate the filling thereof or for closing the bag or for other like reasons. Similarly, other apertures may be required in one wall of the bag 14 such as shown in phantom at 61, 62 and 63 as for inspection purposes, for the insertion of liquid conducting tubes, for dated tags and removable inserts and the like. It was formerly considered to be expensive and difficult to provide such cut away portions and apertures in only one wall of flattened tubular material. Of course, if any normal cutting tool is brought against either side of the double layer of material, it would be substantially impossible to adjust the mechanism to cut through only one of the walls and not the other.

The first and second pair of pressure rollers 24 and 25 and 28 and 29 as mentioned heretofore, serve to rotate the web ninety degrees so that what was formerly an edge of the web 30 and 31 is now located in the middle. Thus, for example, the portion of the web to the right of the line indicated as 31 in FIG. 2 will finally become one wall of the container 14 although in this area, it comprises half of one wall and the corresponding half of the other. Thus, when the cutting tool 35 passes through both halves of the material to the right of the line 31 in FIG. 2, it will pass through both walls in that area. Eventually, however, when the web 20 is returned to its original position past the fourth pair of pressure rollers 40 and 41, the material will be rotated so that the entire cutout is in only one wall of the container 14.

As was mentioned, the web 20 between the first and second pair of rollers is in the form of a tetrahedran. To facilitate the continued formation of this shape, it has been found desirable to provide air under pressure within the web 20 between these rollers when the web is first conducted through the apertures. Thus, air under pressure is blown into the web 20 and the pressure is maintained only until the pressure rollers 28 and 29 and 24 and 25 are tightly together, thus assuring that the air trapped within the web between these rollers cannot escape. Alternatively, air may be fed into the web by a hypodermic needle. As the hypodermic needle is withdrawn, tape may be urged over the opening sealing the same. This effectively forms a bubble which is continuously maintained between the pairs of rollers, thus assuring the continuance of the tetrahedran shape. After relatively long periods of continued operation, there may be some loss of air and it will then be necessary to replenish the supply of air within the web between the first and second pairs of rollers. This, of course, can easily be accomplished by temporarily separating one of the pair of rollers and blowing air within the interior of the web.

Shown in the illustrative embodiment is the formation of a cut-away portion of the wall 14 to provide an extending lip 60 in the other wall 13. For this purpose, the cutting tool 35 will cut a slot extending half way across the web and through what is then both walls. Additionally, as will be pointed out, it will be most desirable if the width of the slot provided by cutting tool 35 would be double that required for each individual bag 10 whereby two bags may be fabricated during each cycle of the machine.

Reference now to FIG. 1, when the web 20 reaches the conveyor belt 44, it will have a notch 70 through one wall 14 thereof while the other wall 13 is substantially intact. This effect has never heretofore been accomplished on a similarly automatic apparatus. The material is advanced on a conveyor belt 44 until the center line of the notch 70 is directly under the first knife 45. Thus, when the knife 45 descends, it will sever only the center of the wall 13 along a line 71 thereby severing the continuous web 20. As will be seen at A, in FIG. 1, this will provide the opening portions of two bags 10 in an opposed or back-to-back relationship when next the web is advanced. However, spaced forward of the first knife 45 by a distance corresponding to one bag length, is the second hot sealing and severing knife 46. When the said knife 46 descends, it will sever both walls 13 and 14 of the web 20 while sealing the confronting edges together. As will be seen at B in FIG. 1, this will provide the sealed edges of two adjacent bags 10 in an opposed or back-to-back relationship.

The final conveyor 49 may be timed to operate somewhat faster than the other belts, thereby separating each bag 10.

Thus, as the web 20 is advanced two bag lengths past each of the knives 45 and 46 during each cycle of the machine, two bags will be formed in a back-to-back relationship with suitable notches, apertures, or openings in one of the walls 14. Each descent of the cold knife 45 will provide the openings of two bags and each descent of the hot knife 46 will provide the sealed ends of two bags.

Of course, additional embellishments may be added on commercial machinery embodying this invention. For example, continuously operating hot and cold knives 45 and 46 or other similar severing devices may be utilized in order to allow continuous operation and advance of the web 20. If, however, it is desired to operate the hot and cold knives intermittently, it may become desirable to provide a compensator or other web advancing mechanism between the fourth pair of rollers 40 and 41 and the draw rollers 42 and 43 so that the web 20 will advance continuously through the first portion of the apparatus and intermittently through the remainder thereof.

Additionally, other apparatus may be added to produce still other special effects on tubular bag forming material.

For example, certain bags commonly known as gusseted bags are provided with separate side portions connecting the overlying front and back walls of the bag. Such gussets are necessary as when forming bags to store bulky items. It has heretofore been considered impossible to print advertising matter or the like on the side portions of a bag as is commonly accomplished on the front and back overlying walls. This device may be utilized to accomplish this function as illustration in the diagrammatic FIG. 5. FIG. 5 is a fractional view corresponding to FIG. 3 but illustrating the additional features of this portion of the invention. As the parts are substantially similar, the same reference numerals will be utilized as before except where the parts are different.

In FIG. 5 the web 20 immediately after being conducted past the second pair of rollers 28 and 29 may be conducted laterally to a first and second web printing station 100 and 101. The said web printing stations 100 and 101 may be adapted to print any portion of the web 20 and may especially print the center portions thereof. These center portions of the web in this area will later become the edge portions of the finished bag. Thus, the finished bag may have printed edges as well as printed front and back sides. Of course, the printing of the front and back sides of the bag may be accomplished on web 20 prior to the advance of the web to the first guide roller 22.

Combinations of cutting apparatus, printing apparatus and other similar devices may be provided between the second and third pair of rollers to accomplish any desired result in the finished bag 10 now more desirably produced from tubular material.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described my invention and illustrated its use, what I claim as new and desire to secure by Letters Patent is:

1. A method of successively producing from an elongated plastic tube bags which include a front wall, a rear wall having an upper lip thereon extending beyond said front wall, and which have an opening bounded by said front and rear walls adjacent said upper lip, said method comprising the steps of feeding said tube lengthwise, folding said tube during said lengthwise movement into a first folded configuration of a substantially planar nature having two superposed walls, a width corresponding to the diameter of said tube, and fold lines along opposite sides edges, producing a notch in both superposed walls of said first folded configuration, said notch extending from one said fold line inwardly for a predetermined extent of the width of said first folded configuration, refolding said notched tube into a second folded configuration similarly of a substantially planar nature having two superposed walls and wherein said notch exists primarily in only one said wall and the other said wall is contiguous lengthwise of said tube, and severing said last-named contiguous wall intermediate the edges bounding said notch to thereby form the upper lip for a pair of bags successively produced from said tube.

2. A method of producing bags from an elongated plastic tube a defined in claim 1 wherein said tube is fed lengthwise from a first pair of rollers to a second pair of rollers to produce said first and second folded configurations thereof, said pairs of rollers being oriented ninety degrees out of phase with each other and said tube being refolded during travel therebetween such that the opposite side edges of the tube as it exits from said first pair of rollers coincides with the longitudinal center line of the tube as it enters between said second pair of rollers.

References Cited

UNITED STATES PATENTS

| | | | |
|---|---|---|---|
| 1,525,356 | 2/1925 | Arrouquier | 93—63 |
| 2,106,431 | 1/1938 | Jones | 93—18 |
| 2,726,706 | 12/1955 | Hakomaki. | |
| 2,976,697 | 3/1961 | Lerner | 93—35 X |

BERNARD STICKNEY, *Primary Examiner.*